(12) United States Patent
Hacsi

(10) Patent No.: US 7,157,884 B2
(45) Date of Patent: Jan. 2, 2007

(54) METHOD AND CIRCUIT FOR ENERGIZING AND DE-ENERGIZING AN ELECTRIC ENERGY STORAGE DEVICE

(76) Inventor: James Scott Hacsi, 13 Dartmouth Ave., Pueblo, CO (US) 81005

( * ) Notice: Subject to any disclaimer, the term of this patent is extended or adjusted under 35 U.S.C. 154(b) by 61 days.

(21) Appl. No.: 10/809,670

(22) Filed: Mar. 26, 2004

(65) Prior Publication Data
US 2005/0212492 A1    Sep. 29, 2005

(51) Int. Cl.
*H02J 7/00*    (2006.01)

(52) U.S. Cl. .................. 320/167; 320/117; 320/121

(58) Field of Classification Search ............. 320/117, 320/118, 166, 167, 121
See application file for complete search history.

(56) References Cited

U.S. PATENT DOCUMENTS

| | | | |
|---|---|---|---|
| 2,819,410 A * | 1/1958 | Haner, Jr. ................. 307/31 |
| 3,855,494 A | 12/1974 | Vanessen | |
| 4,691,180 A * | 9/1987 | Grunert et al. ............. 335/6 |
| 5,068,757 A | 11/1991 | Hughes | |
| 5,481,178 A | 1/1996 | Wilcox | |
| 6,268,710 B1 * | 7/2001 | Koga ........................ 320/116 |
| 6,304,066 B1 | 10/2001 | Wilcox | |
| 6,452,361 B1 * | 9/2002 | Dougherty et al. ......... 320/104 |
| 6,611,166 B1 * | 8/2003 | Chan et al. ................. 327/536 |
| 6,645,675 B1 * | 11/2003 | Munshi ..................... 429/305 |

OTHER PUBLICATIONS

Stanley Wolf; "Guide to Electronic Measurements and Laboratory Practice"; Prentice-Hall; pp. 202-203 (1973).*

* cited by examiner

*Primary Examiner*—Karl Easthom
*Assistant Examiner*—Samuel Berhanu

(57) ABSTRACT

A method and circuit for energizing an electric energy storage device (10) to a high voltage with electric energy supplied by a high voltage electric power source (16) in a safe, effective and efficient manner by first moving electric charges supplied by a high voltage power source (16) to a capacitive device (20) and then subsequently transferring the electric charges stored in an energized capacitive device (20) to an electric energy storage device (10) for later use. A method and circuit for de-energizing an electric energy storage device (10) from a very high voltage in a safe, effective, and efficient manner by first moving electric charges supplied by the electric energy storage device to a capacitive device (20) and then subsequently de-energizing an energized capacitive device (20) through an electrical load device (18) so that useful work can be performed.

2 Claims, 1 Drawing Sheet

Figure 1:
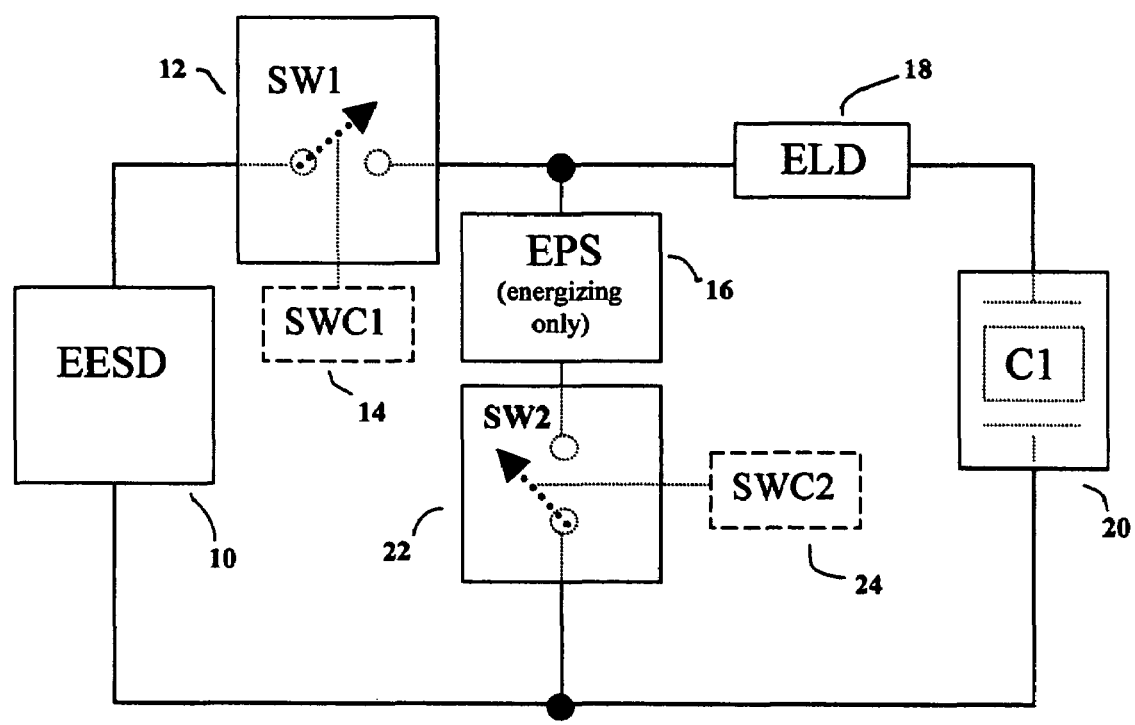

METHOD AND CIRCUIT FOR ENERGIZING AND DE-ENERGIZING AN ELECTRIC ENERGY STORAGE DEVICE

CROSS-REFERENCE TO RELATED APPLICATIONS

Not applicable

STATEMENT REGARDING FEDERALLY SPONSORED RESEARCH AND DEVELOPMENT

Not applicable

BACKGROUND

1. Field of Invention

The present invention relates to a method and circuit for energizing and de-energizing an electric energy storage device to and from very high voltages, respectively.

2. Description of Prior Art

High-voltage, high-energy capacitors store electrical energy very efficiently, but there is no known means available to safely or effectively control the discharge of such terribly dangerous devices that are energized to several thousands of volts. Currently, one of the few methods for de-energizing a capacitor energized to a very high dc voltage employs gas-filled or vacuum tubes that are expensive, bulky, and inefficient. Such tubes are usually placed in series with the capacitor while an increasing dc voltage is applied. When the applied voltage reaches the breakdown voltage of the gas in the tube, arcing in the tube occurs and a tremendous surge of electrical current results that decreases rapidly over time. Once a gas-filled tube is turned on, there is no means to turn off the device to stop or impede current flow from the capacitor.

Capacitors, even when energized to very high dc voltages, have a relatively low energy density and yet the problems associated with controlling their charging and discharging are many. The amount of potential energy stored by an electrical storage device working on the principle of packing electrical charges into a small volume or mass is equal to the sum of all the energy and work associated with bringing each point charge into a position in the electrostatic or electric field. So it seems reasonable to assume that to increase the energy density and specific energy of an electric energy storage device of the future there would be great advantage to using as high an operating voltage as possible. However, since it is already such a cumbersome task to charge and discharge a relatively low energy density capacitor energized to a very high dc voltage, then the controlling of the charging and discharging of a novel high energy density, high specific energy electric storage device of the future in a safe, effective and efficient manner will be next to impossible. Therefore, the charging and discharging of an existing high voltage capacitor or a novel high voltage, high energy density electrical storage device of the future requires a switching method not now available which intermittently separates the storage device from the electrical load while small quantities of electrical current can be supplied to the load device since the tremendous surge of electrical current would most likely destroy electrical components in the load circuitry. Crude methods now in use today for charging and discharging high voltage electric energy storage devices require components with unreasonable power handling capabilities for withstanding the huge electrical current and large quantities of waste heat associated with a high-current discharge from any high voltage electric power source or electrical storage device. There is simply no electric switching method available at this time that can be utilized to control and limit the deadly and destructive electric current that arises when energizing or de-energizing any electric energy storage device that can operate at a high enough electric potential to be effective and efficient.

SUMMARY

It is therefore the object of the present invention to provide a method and circuit for transferring electric energy to a high voltage electric energy storage device such as a capacitor or other novel high voltage, high energy density electric energy storage device of the future from a high-voltage electric power source in a safe, effective, and efficient manner. It is also the object of the present invention to provide a method and circuit for transferring electric energy from an energized high voltage electric energy storage device such as a capacitor or other novel high voltage, high energy density electric energy storage device of the future to an electrical load device.

Objects and Advantages

Accordingly, besides the objects and advantages of the method and circuit for energizing and de-energizing an electric energy storage device to and from high voltages respectively, as described above, several other objects and advantages of the present invention are:

(a) to provide a safe method and circuit for retrieving stored electrical energy from an electrical energy storage device that has been energized to many thousands of volts dc by preventing excessive and destructive electric current from flowing at any time;

(b) to provide a safe method and circuit for supplying electrical energy to an electrical energy storage device that will be energized to many thousands of volts dc by preventing excessive and destructive electric current from flowing at any time;

(c) to provide a more effective method and circuit for retrieving stored electrical energy from an electrical energy storage device that has been energized to many thousands of volts dc by eliminating the use of, and need for, bulky and expensive gas-filled tubes or other unreasonably large electrical components;

(d) to provide a more effective method and circuit for supplying electrical energy to an electrical energy storage device that will be energized to many thousands of volts dc by eliminating the use of, and need for, bulky and expensive gas-filled tubes or other unreasonably large electronic components;

(e) to provide an efficient method and circuit for retrieving electrical energy from an electrical energy storage device that will be energized to many thousands of volts dc by transferring with relatively few losses, a large percentage of electrical energy to the electrical load device where useful work can be performed.

(f) to provide an efficient method and circuit for supplying electrical energy to an electrical energy storage device that will be energized to many thousands of volts dc by transferring with relatively few losses, a large percentage of electrical energy supplied by the electric power source;

DRAWING FIGURE

FIG. 1 shows a schematic view of a circuit comprised of blocks of electrical components that work together to execute the method identified as one aspect of the present invention.

REFERENCE NUMERALS IN DRAWING 10 electric energy storage device
12 first means for preventing electric current flow
14 first means for controlling first means for preventing electric current flow
16 electric power source
18 electrical load device
20 capacitive device
22 second means for preventing electric current flow
24 second means for controlling second means for preventing electric current flow

DESCRIPTION

FIG. 1—Preferred Embodiment

A preferred embodiment of the circuit of the present invention is illustrated in FIG. 1 of the single drawing. FIG. 1 shows a circuit comprised of discrete electrical components as well as blocks of electrical components. The EESD 10 is a high voltage, electric energy storage device to be energized or de-energized by using the present invention or it may be comprised of a capacitor with a high value of capacitance that can withstand being energized to a very high dc voltage or it may be comprised of a novel high voltage, high energy density electric energy storage device of the future. By definition, "energizing" the electric energy storage device, EESD 10, is taken to mean adding electric energy to, or increasing the amount of potential electric energy. Conversely, "de-energizing" implies removing electric energy from or decreasing the amount of electric potential energy. The first means for preventing electric current flow, SW1 12 and the second means for preventing electric current flow, SW2 22 are each comprised of an electrical component or a plurality of electrical components working alone or together as an electrical switch to be opened or closed in electrical terms to allow or prevent electric current in the circuit. Both SW1 12 and SW2 22 technically function as electrical switches and when they are said to be "open" or "closed" in the following operational description, it should be understood to mean preventing or allowing electric current, respectively. The first means for controlling the first means for preventing electric current flow, SWC1 14 and the second means for controlling the second means for preventing electric current flow, SWC2 24 are each comprised of electrical components working together to control SW1 12 and SW2 22 respectively, or they may simply indicate the use of the human hand to manually activate the first means for preventing electric current flow, SW1 12 and the second means for preventing electric current flow, SW2 22 at the appropriate time. A high voltage electric power source, EPS 16 supplies electric energy to energize the high voltage electric energy storage device, EESD 10. It will be shown that the EPS 16 is only present or needed during the energizing cycle to be described later. C1 20 is a capacitive device with a predetermined value of capacitance. The ELD 18 is comprised of various electrical components to transform the output electric energy into a usable form to be used by an electrical load to perform useful work. It will be shown that the ELD 18 makes use of energy stored by the EESD 10, so it is only present or needed in the circuit during the cycle of de-energizing the EESD 10 and it is bypassed in the cycle of energizing the EESD 10 by a low-resistance wire or conductor.

Operation—FIG. 1

To begin the cycle of energizing the EESD 10, SW1 12 is opened by SWC1 14 and SW2 22 is closed by SWC2 24 to allow electric current to flow from the EPS 16 to C1 20. Note that if both SW1 12 and SW2 22 were inadvertently closed in electrical terms at the same time, then a destructive current would flow in the circuit since the EESD 10 initially presents itself as a short circuit to the EPS 16. But, since the EESD 10 is isolated from the EPS 16 at this point in the cycle, electric current will flow to C1 20 from the EPS 16 only until C1 20 becomes energized to a voltage equal to the voltage of the EPS 16. Once C1 20 becomes fully energized, the voltage of C1 20 acts in opposition to the EPS 16 voltage and electrical current in the circuit will cease. The ability of C1 20 to become energized to an electric potential equal to the voltage of the EPS 16 and to stop electric current from flowing in the circuit is one of the most important aspects of the present method and circuit. Additionally, it is the capacitance value of C1 20 that determines the amount of current that will flow in the circuit at any time.

Energy temporarily stored by C1 20 is then transferred to the EESD 10 by first opening SW2 22 with SWC2 24 and then closing SW1 12 with SWC1 14. This switch configuration insures that the EPS 16 is still isolated from the EESD 10 and only the limited amount of energy temporarily stored by C1 20 must be handled by the components in the circuit at any one time. The value of capacitance of C1 20 therefore determines the amount of current in the circuit and even though C1 20 may be charged to a very high dc voltage, the quantity of energy transferred first to C1 20 by the EPS 16 and then subsequently from C1 20 to the EESD 10 is quite manageable.

So, the cycle of energizing the EESD 10 is comprised of first transferring a manageable quantity of energy from the EPS 16 to C1 20 by the proper positioning in electrical terms of SW1 12 and SW2 22 by SWC1 14 and SWC2 24 respectively, and then later transferring the energy temporarily stored by C1 20 to the EESD 10 by the proper positioning in electrical terms of SW1 12 and SW2 22 by SWC1 14 and SWC2 24 respectively so that no direct electrical connection is ever made between the EPS 16 and the EESD 10. Simply put, C1 20 acts as a buffer between the EPS 16 and the EESD 10 allowing only a reasonable and manageable electric current to flow in the circuit while energizing the EESD 10 with energy from the EPS 16. The cycle of first transferring energy from the EPS 16 to C1 20 and then from C1 20 to the EESD 10 by using appropriate switching actions of SW1 12 and SW2 22 is repeated until the EESD 10 is energized to the voltage, or electric potential, of the EPS 16. Safely de-energizing the EESD 10 and supplying stored electric energy to the ELD 18 requires SW1 12 and SW2 22 to be opened and closed by SWC1 14 and SWC2 24 respectively, in a proper sequence. Remember the EPS 16 is not in the circuit while de-energizing the EESD 10 and is replaced by a low-resistance wire as far as demonstration purposes are concerned. To begin the cycle of de-energizing the EESD 10, SW2 22 is first opened by SWC2 24 and SW1 12 is closed by SWC1 22 to allow electric current to flow from the EESD 10 to C1 20. Note that if both SW1 12 and SW2 22 were inadvertently closed in electrical terms at the same time, then a destructive current would flow in the circuit since the ELD 18 always presents itself as a very low electrical resistance to the energized EESD 10. Electric current supplied by the EESD 10 will flow to C1 20 through the ELD 18 only until C1 20 becomes energized to a voltage equal to the voltage of the EESD 10. Once C1 20 becomes fully energized, the voltage of C1 20 acts in opposition to the EESD 10 voltage and electrical current in the circuit will cease. Again, the ability of C1 20 to be energized and stop current flow is very advantageous.

Energy temporarily stored by C1 20 is then transferred to the ELD 18 in the opposite direction in electrical terms, by first opening SW1 12 with SWC1 14 and then closing SW2 22 with SWC2 24. This switch configuration insures that the EESD 10 is isolated from the ELD 18 unless C1 20 is also in the circuit to limit the amount of current flowing. Again, the value of capacitance of C1 20 therefore determines the amount of current in the circuit and even though C1 20 may be energized to a very high dc voltage, the packet of energy transferred first to C1 20 by the EESD 10 and then subsequently from C1 20 to the ELD 18 is quite manageable. For example, the primary of a step-down transformer in the ELD 18 would easily handle the relatively small amount of electric energy when C1 20 discharges even from a voltage of several thousands of volts, whereas a high-energy discharge coming directly from the EESD 10 would literally destroy the transformer windings and anything else in its path.

So, the cycle of de-energizing the EESD 10 is comprised of first transferring a manageable quantity of energy from the EESD 10 to C1 20 through the ELD 18 in one direction in electrical terms by the proper positioning in electrical terms of SW1 12 and SW2 22 by SWC1 14 and SWC2 24 respectively, and then later transferring the energy temporarily stored by C1 20 to the ELD 18 by the proper positioning in electrical terms of SW1 12 and SW2 22 by SWC1 14 and SWC2 24 respectively so that no direct electrical connection is ever made between the EESD 10 and the ELD 18 unless C1 20 is also in the circuit to stop a destructive electric current from flowing through the circuit's components. Simply put, C1 20 acts as a buffer between the EESD 10 and the ELD 18 allowing only a reasonable and manageable electric current to flow in the circuit at any particular time while de-energizing the EESD 10 and supplying energy stored by the EESD 10 to the ELD 18. The cycle of first transferring stored electric energy from the EESD 10 to C1 20 through the ELD 18 and then subsequently from C1 20 to the ELD 18 in the opposite direction in electrical terms by using appropriate switching actions of SW1 12 and SW2 22, is repeated until the EESD 10 is fully de-energized and all of the stored electric energy has been transferred to the ELD 18 where useful work is performed. It is interesting to note that the escapement in a wind-up clock controls the release of mechanical energy from a tightly wound spring just as the capacitive device, C1 20, restricts or controls the amount of electrical energy flowing to or from the electrical energy storage device, EESD 10.

Advantages

An important aspect of this switching method identified as the present invention, is there is never a need to open SW1 12 and SW2 22 while electric current is flowing through the components of which they are comprised. The zero-current switching feature insures safety, effectiveness and efficiency during the cycles of energizing and de-energizing the EESD 10 and that is why the described electrical switching method identified as the present invention is so advantageous for use both now and in the future.

Conclusion, Ramifications, and Scope

Accordingly, the reader will see that the circuit and method of this present invention can be used to safely, effectively, and efficiently energize and de-energize an electric energy storage device, whether it be a capacitor or a novel high energy density electric energy storage device of the future, to and from extremely high voltages, respectively.

Furthermore, the present invention has the additional advantages in that it permits electrical energy storage devices to be devised which operate at very high voltages and thus exhibit a very high energy density along with a very high power density;

it permits electrical energy to be stored efficiently at very high voltages, possibly in excess of hundreds of thousands of volts dc;

it permits dangerous high voltage electrical energy storage devices, such as a capacitor with high capacitance or some other novel high voltage, high energy density electric energy storage device of the future, to be used safely in electric vehicles.

Although the description above contains many specificities, these should not be construed as limiting the scope of the invention but as merely providing illustrations of one of the presently preferred embodiments of this invention.

Thus the scope of the invention should be determined by the appended claims and their legal equivalents, rather than by the examples given.

What is claimed is:

1. A method for energizing an electric energy storage device, to a dc voltage, comprising the steps of:
   (a) providing a circuit, said circuit having an electric power source for supplying electric energy to a control capacitor through a first electrical switch and through an electrical load device, and said circuit also having said electric energy storage device for receiving electric energy stored by said control capacitor through a second electrical switch and through said electrical load device then;
   (b) beginning an energizing cycle by closing said first electrical switch connecting said electric power source with said electrical load device and said control capacitor in a series electrical configuration then;
   (c) energizing said control capacitor through said electrical load device with electric energy from said electric power source then;
   (d) opening said first electrical switch then;
   (e) closing said second electrical switch connecting said energized control capacitor with said electric energy storage device and said electrical load device in a series electrical configuration then;
   (f) opening said second electrical switch, thus completing one said energizing cycle and;
   (g) repeating said energizing cycle until said electric energy storage device is energized with electric energy from said electric power source.

2. A method for de-energizing an electric energy storage device, from a dc voltage, comprising the steps of:
   (a) providing a circuit, said circuit having an energized said electric energy storage device for supplying electric energy to a control capacitor through a first electrical switch and through an electrical load device, and said circuit also having a second electrical switch for connecting energized said control capacitor in series electrically with said electrical load device then;

(b) beginning a de-energizing cycle by closing said first electrical switch connecting said electric energy storage device with said electrical load device and said control capacitor in a series electrical configuration then;

(c) energizing said control capacitor through said electrical load device with electric energy from said electric energy storage device then;

(d) opening said first electrical switch then;

(e) closing said second electrical switch connecting said energized control capacitor with said electrical load device in a series electrical configuration then;

(f) opening said second electrical switch, thus completing one said de-energizing cycle and;

(g) repeating said de-energizing cycle until said electric energy storage device is completely de-energized or until no more electric energy is needed by said electrical load device.

* * * * *